Dec. 26, 1933.  H. C. ROTH  1,941,141

PUMP

Filed June 27, 1932  2 Sheets-Sheet 1

INVENTOR.
HARRIS C. ROTH
BY John A. Watson
ATTORNEY.

Dec. 26, 1933.    H. C. ROTH    1,941,141
PUMP
Filed June 27, 1932    2 Sheets-Sheet 2
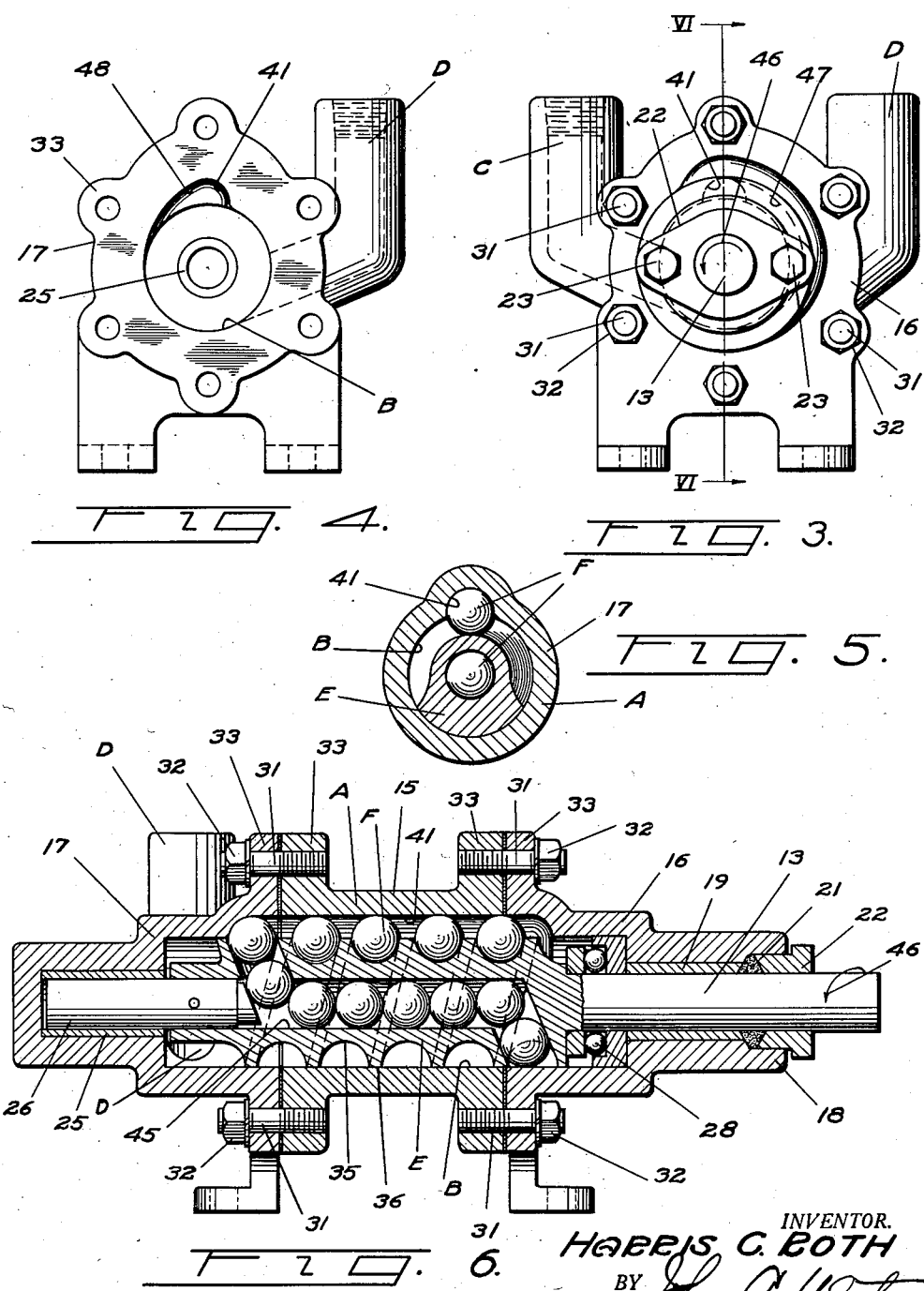

Patented Dec. 26, 1933

1,941,141

UNITED STATES PATENT OFFICE 1,941,141

PUMP

Harris C. Roth, South Bend, Ind., assignor to The Lubrication Corporation, South Bend, Ind., a corporation of Delaware Application June 27, 1932. Serial No. 619,407

18 Claims. (Cl. 103—125)

This invention relates to improvements in lubricating devices and more particularly to pressure feed pumps for lubricant and similar fluids.

An object of my invention is to provide a pressure feed lubricant pump capable of high speed operation and therefore attaining relatively high output with respect to its size and weight as well as adaptation to electric motive power by direct drive.

Another object is to provide a pressure feed lubricant pump having a series of packing or sealing stages thereby reducing the inherent pressure losses of the pump to an extremely low level resulting in increased discharge pressure for a given driving torque.

A further object is to provide a pump of the character described wherein the discharge of lubricant therefrom is uniform and constant regardless of the speed at which the pump is driven.

Other objects the advantages and uses will be, or should become apparent after a reading of the following description of several illustrative embodiments which are shown in the accompanying drawings, in which:

Fig. 3 is an end elevation of the pump;

Fig. 4 is an inner end elevation of the remote end closure of the pump housing;

Fig. 5 is a sectional view along the line V—V of Fig. 2; and

Fig. 6 is a sectional view along the line VI—VI of Fig. 3.

Figures 1, 2:
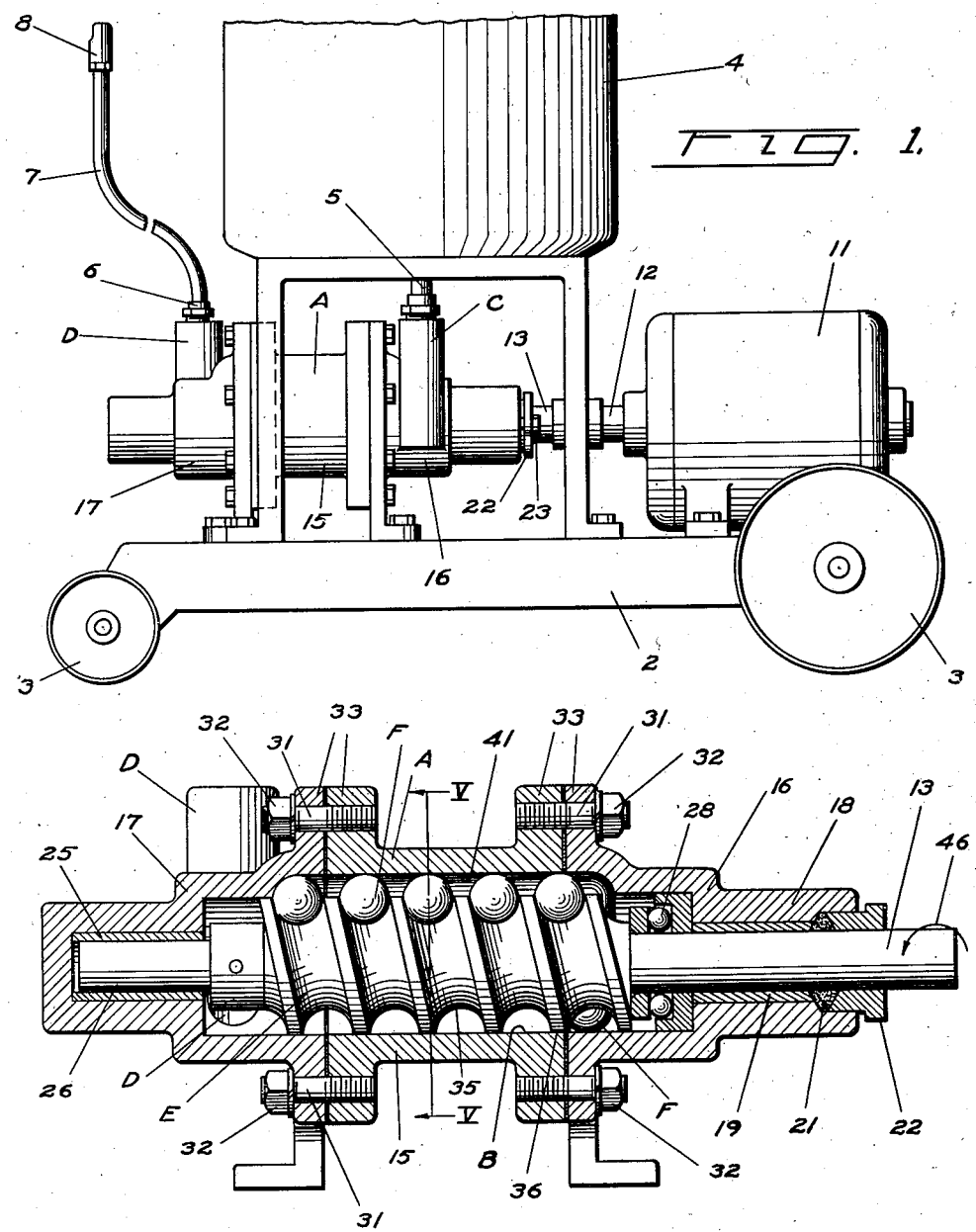
Fig. 1 is a side elevation of a motor driven pressure feed lubricant pump incorporating the features of my invention.
Fig. 2 is a sectional view through the pump housing illustrating the moving elements in elevation.

In general the pressure feed lubricant pump selected for illustration herein comprises, a pump housing A providing a pump chamber B, an inlet port C adapted for connection to a source of lubricant or other fluid supply and a discharge port D adapted for connection to a lubricant discharge conduit or similar fluid conducting means, a rotating pump element E having the form of a screw of high pitch mounted for rotation in the chamber B and a series of steel balls F arranged to travel in an endless path within a plane containing the axis of the rotating pump screw A to form a series of packing or sealing stages between each successive 360° of the screw thread.

In Fig. 1 a complete power driven lubricant pump assembly is illustrated mounted upon a carriage 2 having wheels 3 whereby the assembly may be moved about upon the floor of a lubricant servicing station or other place where it is to be employed. A lubricant reservoir 4 is supported upon the carriage 2 and connected at 5 with the internally threaded inlet port C of the pump. The discharge port D may be connected by a coupling union 6 to a flexible lubricant conducting hose 7 having a discharge nozzle 8 connected to its outer end by means of which lubricant may be fed under pressure to a lubricant receiving fitting. An electric motor 11 is mounted upon the carriage 2 with its drive shaft 12 coupled directly to the driven shaft 13 of the pump screw E. The pump shaft 13 may be formed integral with the screw E as shown in Fig. 6.

With reference to Figs. 2 to 6 inclusive, the pump housing A defining the chamber B comprises a substantially cylindrical body 15 and end closures or head members 16 and 17 for the opposite ends of the body 15 respectively. The head 16 terminates in a tubular portion 18 containing a bearing sleeve 19 for the shaft 13. A packing gland 21 and bushing 22 are provided to seal the outer end of the bearing 19 against the escape of lubricant under flow. The bushing 22 is held in place by a pair of draw bolts 23 secured to the head 16 and engageable with a flange formed on the bushing. The parts 15, 16 and 17 of the housing may be constructed of cast steel with the inlet C and outlet D formed in the head parts 16 and 17 respectively. The head 17 has a deep cylindrical bore or pocket formed in the inner wall within which a bearing sleeve 25 is disposed to provide a bearing support for a shaft 26 secured to the remote end of the pump screw E along the axis thereof. A ball bearing assembly 28 is interposed between the inlet end of the pump screw E and the adjacent wall of the head 16 to provide a frictionless thrust bearing for the screw during operation. The head members 16 and 17 are secured to the body 15 of the pump housing by bolts 31 and nuts 32 engageable with integral flanges 33 formed on the adjacent ends of the body and head members respectively.

With reference to Figs. 2 and 6, it may be seen that the root of the screw thread of the pump screw E is semi-circular in cross-section as shown at 35 and that the outer surface of the thread is flat as shown at 36. The internal diameter of the pump chamber B is such as to effect engagement between the outer surface of the screw and the walls of the pump chamber.

The assembly of parts thus far described comprise a screw pump in its common embodiment capable of discharging fluids admitted to its inlet port C through its discharge port D under relatively low pressures, with the screw functioning as an impeller to urge flow through moving encounter with the fluid and not as a positive pressure producing driven element.

To provide positive pressure producing characteristics in the pump, a depression 41 is formed in the side wall of the chamber B extending throughout the length of the body 15 and into the head members 16 and 17 respectively. The depression 41 is semi-circular in cross section and has a radius in common with the wall 35 of the root of the screw threads of the member E. The steel balls F arranged between the threads of the pump screw E and bearing upon the surface 35 are partially received in the depression 41 and closely contact the side walls thereof. As the pump screw is rotated, the balls F are forced to travel along the longitudinal axis of the depression from one end of the pump chamber to the other, each ball serving as a seal between successive turns of the threaded portion of the pump screw. With reference to Fig. 6, a series of bores are formed in the body of the pump screw E comprising a passageway 45 communicating with opposite ends of the screw at its root on diametrically opposite sides of the screw. The passage 45 serves as a means through which the balls F may be returned from the discharge end of the pump screw to the inlet end upon completion of their progressive forward movement along the depresison 41 as the pump screw is rotated in the direction of the arrow 46. In Figs. 3 and 4 in dotted and full lines 47 and 48 respectively, the contour of the chamber B at the ends of the depression 41 may be seen as including a gradually sloping portion of one side wall of the depression 41 toward the major cylindrical surface of the chamber. The purpose of the sloping portion 48 is to urge the foremost of the balls F in the depression 41 into the passageway 45 at the terminating of its forward movement between the cooperating surface 35 of the thread root and the walls of the depression 41 respectively. The purpose of the sloping surface 47 is to admit the rearmost of the balls F in the passageway 45 to the surface of the pump screw to take the place of the ball urged into the passageway 45 at the forward or discharge end of the pump chamber. Inasmuch as the balls within the passageway 45 are maintained in contact with one another, as one is urged into the passageway another will be urged outwardly at the rearmost or inlet end of the pump.

I have thus provided a positive pressure feed fluid pump which is particularly adaptable for use in delivering lubricant under high pressures from a lubricant reservoir as shown in Fig. 1 and wherein its positive high pressure characteristics are attained through the use of a plurality of sealing members embodied in the steel balls F arranged in series. It will be evident that while I have shown herein a series of five of the sealing balls F that more or less may be employed depending upon the duties for which the pump is designed.

In addition to the advantages of high pressure output the pump possesses the added and important advantage of being capable of direct drive from the shaft of a relatively high speed electric motor or other driving means, thus permitting a material reduction in the size of the pump chamber and pump screw because of the high speed at which the screw may operate.

I claim:

1. A fluid pump comprising, a chamber having an inlet and an outlet port, a pump screw mounted for rotation in said chamber, a plurality of sealing members disposed along the root wall of said pump screw and cooperating with the walls of said chamber to form a seal between adjacent turns of the screw and means for conducting the sealing members from one end of the screw to the other through the body of the screw.

2. A fluid pump comprising, a chamber having an inlet and an outlet port, a pump screw mounted for rotation in said chamber, a plurality of sealing members disposed along the root wall of said pump screw and cooperating with the walls of said chamber to form a seal between adjacent turns of the screw and means for conducting the sealing members from one end of the screw to the other through the body of the screw, the course of travel of said sealing members exteriorly of the screw body being confined to a plane substantially parallel to the axis of the screw.

3. A fluid pump comprising, a chamber having an inlet and an outlet port at opposite ends respectively, a pump screw mounted for rotation in said chamber, a plurality of sealing balls disposed upon and uniformly contacting the root walls of said pump screw, means for confining movement of said balls on said root wall longitudinally of the pump screw whereby rotation of said screw may cause said ball to progress from one end of the pump screw to the other, and means for returning said balls through the body of said pump screw to said first named end of said pump screw.

4. A fluid pump comprising, a chamber having an inlet and an outlet port at opposite ends respectively, a pump screw mounted for rotation in said chamber, a plurality of sealing balls disposed upon and uniformly contacting the root walls of said pump screw, means for confining movement of said balls on said root wall longitudinally of the pump screw whereby rotation of said screw may cause said ball to progress from one end of the pump screw to the other, and means for returning said balls through the body of said pump screw to said first named end of said pump screw, the course of travel of said sealing balls exteriorly of the screw body being confined to a plane including the axis of said pump screw.

5. A fluid pump comprising, a substantially cylindrical pump chamber formed with a depression extending longitudinally along one wall thereof, a pump screw rotatably mounted in said chamber, a plurality of disconnected movable sealing members disposed between the walls of said depression and the root walls of said pump screw to form a fluid tight seal between the adjacent turns of said screw, said sealing members being urged longitudinally of said screw along the walls of said depression as the pump screw is rotated said depression having a cross sectional contour following the cross sectional contour of the root walls of said screw and means for returning the sealing members to the starting point of their travel relative to said screw upon arriving at one end of said depression.

6. A fluid pump comprising, a substantially cylindrical pump chamber formed with a depression extending longitudinally along one wall thereof, a pump screw rotatably mounted in said chamber, a plurality of movable sealing members disposed between the walls of said depression and the root walls of said pump screw to form a fluid tight seal between the adjacent turns of said screw, said sealing members being urged longitudinally of said screw along the walls of said depression as the pump screw is rotated and means for returning the sealing members through the body of said pump screw to the starting point of their travel relative to said screw upon arriving at one end of said depression.

7. A fluid pump comprising, a pump chamber having an inlet and a discharge port, a pump screw mounted for rotation in said chamber, said pump screw having a passageway extending from the root wall of the discharge end thereof to the root wall of its inlet end, a series of sealing members disposed upon the root walls of said pump screw, means for guiding the sealing members longitudinally of the screw as the pump screw is rotated and means for urging said sealing member into and through said passageway, from the discharge end of said pump screw to the inlet end thereof upon completion of their long travel longitudinally of the pump screw and pump chamber.

8. A fluid pump comprising a pump chamber having an inlet and a discharge port, a pump screw mounted for rotation in said chamber, said pump screw having a passageway extending from the root wall of the discharge end thereof to the root wall of its inlet end, a series of steel balls disposed upon the root wall of said pump screw for providing a lubricant tight seal between the adjacent turns of said pump screw, means for guiding the steel balls longitudinally of the screw as the pump screw is rotated and means for urging said steel balls into and through said passageway from the discharge end of said pump screw to the inlet end thereof upon completion of their long travel longitudinally of the pump screw and pump chamber.

9. A fluid pump comprising, a chamber having an inlet and an outlet port, a pump screw mounted for rotation in said chamber, a frictionless thrust bearing for the inlet end of said pump screw, said screw having a drive shaft at one end extending exteriorly of said chamber and having a bearing shaft at its other end disposed within said chamber, a plurality of sealing members disposed along the root wall of said pump screw and cooperating with the walls of said chamber to form a seal between adjacent turns of the screw and means for conducting the sealing members from one end of the screw to the other through the body of the screw.

10. In a pressure feed fluid pump, a driven rotating element having a helical groove about the outer wall thereof, a plurality of sealing members movably disposed in said groove to form a seal between the adjacent turns of said helical groove, means for guiding said sealing members longitudinally of said driven element as the element is rotated, and a passageway through the body of said rotating element communicating with the effective ends of said grooves for conducting said sealing members from one effective end of said groove to the other.

11. In a pressure feed fluid pump, a driven rotating element having a helical groove in the outer wall thereof concentric with its axis of rotation, a plurality of sealing members movably disposed in said groove to form a seal between the adjacent turns of said helical groove, means for guiding said sealing members longitudinally of said driven element as the element is rotated, and a passageway through the body of said rotating element communicating with the effective ends of said grooves for conducting said sealing members from one effective end of said groove to the other.

12. In a pressure feed fluid pump, a driven rotating element having a helical groove in the outer wall thereof concentric with its axis of rotation, a plurality of sealing members movably disposed in said groove to form a seal between the adjacent turns of said helical groove, means for guiding said sealing members longitudinally of said driven element as the element is rotated, and means for conducting said sealing members through the body of said driven element upon the termination of their travel in said groove longitudinally of the said driven element from one end of said groove to the other.

13. In a pressure feed fluid pump, a driven rotating element having a helical groove in the outer wall thereof concentric with its axis of rotation, a plurality of steel balls movably disposed in said groove to form a seal between the adjacent turns of said helical groove, means for guiding said steel balls longitudinally of said driven element as the element is rotated, and means for conducting said steel balls through the body of said driven element upon the termination of their travel in said groove longitudinally of the said driven element from one end of said groove to the other.

14. A fluid pump comprising, a substantially cylindrical pump chamber, a substantially cylindrical driven element rotatably mounted in said chamber having its outer walls engageable with the walls of said chamber, said driven element being formed with a helical groove about the outer wall thereof, a plurality of sealing members movably disposed in said groove to provide a fluid tight seal between adjacent turns of said helical groove, means for guiding said sealing members longitudinally of the driven element as it is rotated and means for returning said sealing members through the body of said driven element upon completion of their travel longitudinally thereof back to said groove at the opposite end of said driven element.

15. A fluid pump comprising, a substantially cylindrical pump chamber, a substantially cylindrical driven element rotatably mounted in said chamber having its outer walls engageable with the walls of said chamber, said driven element being formed with a helical groove about the outer wall thereof, a plurality of sealing members movably disposed in said groove to provide a fluid tight seal between adjacent turns of said helical groove, said chamber having a longitudinally disposed depression formed therein for guiding said sealing members longitudinally of the driven element as it is rotated and means for returning said sealing members through the body of said driven element upon completion of their travel longitudinally thereof back to said groove at the opposite end of said driven element.

16. A fluid pump comprising, a substantially cylindrical pump chamber, a substantially cylindrical driven element rotatably mounted in said chamber having its outer walls engageable with the walls of said chamber, said driven element being formed with a helical groove about the outer wall thereof, a plurality of steel balls movably disposed in said groove to provide a fluid tight seal between adjacent turns of said helical groove, said chamber having a longitudinally disposed depression formed therein for guiding said steel balls longitudinally of the driven element as it is rotated and means for returning said steel balls through the body of said driven element upon completion of their travel longitudinally thereof back to said groove at the opposite end of said driven element.

17. A fluid pump comprising, a substantially cylindrical pump chamber, a substantially cylindrical driven element rotatably mounted in said chamber having its outer walls engageable with the walls of said chamber, said driven element being formed with a helical groove about the outer wall thereof, said walls of said groove being semi-circular in cross section, a plurality of steel balls movably disposed in said groove to provide a fluid tight seal between adjacent turns of said helical groove, said chamber having a longitudinally disposed depression formed therein semi-circular in cross section for guiding said steel balls longitudinally of the driven element as it is rotated and means for returning said steel balls through the body of said driven element upon completion of their travel longitudinally thereof back to said groove at the opposite end of said driven element.

18. A lubricant pump comprising, a chamber having an inlet and an outlet port at opposite ends respectively, a lubricant reservoir communicating with said inlet port, a discharge nozzle in communication with said outlet port, a pump screw mounted for rotation in said chamber, a plurality of sealing balls disposed upon and uniformly contacting the root walls of said pump screw, means for confining movement of said balls on said root wall longitudinally of the pump screw from the inlet end of the chamber to the outlet end of the chamber whereby rotation of said screw may cause the lubricant to be urged from the inlet port to the outlet port under pressure, means for returning said balls through the body of said pump screw to the inlet end of the chamber and an electric motor having a direct driving connection with said pump screw.

HARRIS C. ROTH.